(12) United States Patent
Kim et al.

(10) Patent No.: US 10,077,797 B2
(45) Date of Patent: Sep. 18, 2018

(54) CABLE ANCHORING DEVICE FOR VIBRATION ISOLATION

(71) Applicant: KYUNG CHANG INDUSTRIAL CO., Ltd., Daegu (KR)

(72) Inventors: Kyu-Jung Kim, Daegu (KR); Chang-Min Lee, Daegu (KR)

(73) Assignee: KYUNG CHANG INDUSTRIAL CO., LTD., Daegu (KR)

( * ) Notice: Subject to any disclaimer, the term of this patent is extended or adjusted under 35 U.S.C. 154(b) by 46 days.

(21) Appl. No.: 14/975,699

(22) Filed: Dec. 18, 2015

(65) Prior Publication Data
US 2016/0201715 A1    Jul. 14, 2016

(30) Foreign Application Priority Data
Jan. 14, 2015    (KR) .................. 10-2015-0006670

(51) Int. Cl.
*F16M 13/00*    (2006.01)
*F16C 1/10*    (2006.01)
*F16C 1/26*    (2006.01)

(52) U.S. Cl.
CPC .............. *F16C 1/108* (2013.01); *F16C 1/103* (2013.01); *F16C 1/262* (2013.01)

(58) Field of Classification Search
CPC .......... F16C 1/108; F16C 1/103; F16C 1/105; F16C 1/102; B60R 16/0215; F16L 3/13; F16L 37/088; F16L 37/14; F16L 27/10; F16L 55/02; B60K 20/00; B60K 20/02
USPC .............................. 74/502.4, 502.5; 248/636
See application file for complete search history.

(56) References Cited

U.S. PATENT DOCUMENTS

| | | | |
|---|---|---|---|
| 2004/0149480 A1* | 8/2004 | Ball .................... | B80R 16/0215 174/77 R |
| 2011/0226083 A1* | 9/2011 | Chiou .................... | F16C 1/102 74/502.4 |
| 2011/0226084 A1* | 9/2011 | Chiou .................... | F16C 1/102 74/502.4 |

* cited by examiner

*Primary Examiner* — Christopher Garft
(74) *Attorney, Agent, or Firm* — Fenwick & West LLP

(57) ABSTRACT

A cable anchoring device includes: a vibration isolation member including a damper; a socket; and a cap. A rib is formed in at least one of the socket and the cap is inserted into a portion of the damper. The vibration isolation member is inserted into a hole formed in the cap. The socket is coupled to the cap. In a state where the rib has been inserted into the portion of the damper, a void is formed in the portion of the damper.

12 Claims, 14 Drawing Sheets

10

# CABLE ANCHORING DEVICE FOR VIBRATION ISOLATION

CROSS-REFERENCE TO RELATED APPLICATION

This application claims priority to Korean Patent Application No. 10-2015-0006670, filed on Jan. 14, 2015, which is incorporated herein by reference for all purposes as if fully set forth herein.

BACKGROUND

Field

The present invention relates to a cable anchoring device for vibration isolation.

Description of Related Art

A cable anchoring device is used to anchor various control cables inside a vehicle, and the like.

When driving a vehicle, a driver operates a shift lever to change a gear position according to the speed of the vehicle, and the driver's operation to change the gear position is transmitted to a transmission component through a transmission cable. For the purpose of fixing the transmission cable to the vehicle's body or transmission component without deviating from a path, a cable socket is fixed to a bracket fixed to the vehicle's body or the transmission component.

However, since a damper which is mounted to isolate the vibration of the vehicle's body is molded within a socket by an insert injection molding method, the properties of rubber are changed due to a high temperature and a high pressure, so that elasticity is reduced and a vibration reduction capability is degraded.

SUMMARY

One embodiment is a cable anchoring device which includes: a vibration isolation member including a damper; a socket; and a cap. A rib formed in at least one of the socket and the cap is inserted into a portion of the damper. The vibration isolation member is inserted into a hole formed in the cap. The socket is coupled to the cap. In a state where the rib has been inserted into the portion of the damper, a void is formed in the portion of the damper.

DETAILED DESCRIPTION

Figure 1:
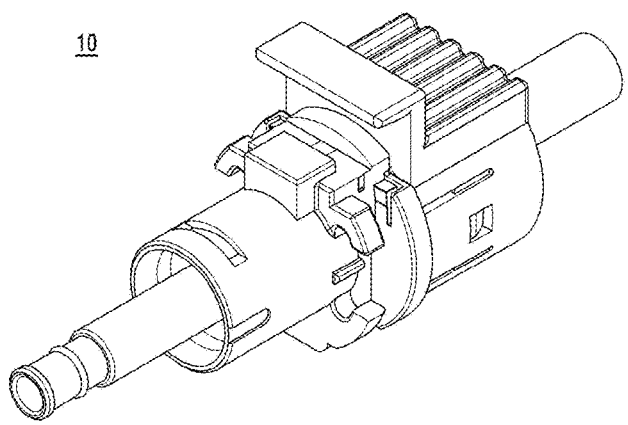
FIG. 1 is a perspective view of a cable anchoring device according to an embodiment.

The following detailed description of the present invention shows various embodiments of the present invention and will be provided with reference to the accompanying drawings. Various embodiments will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, a cable anchoring device according to an embodiment will be described with reference to the accompanying drawings.

According to the cable anchoring device of one embodiment, a cup made of a high-strength material may be inserted within a damper and they may be coupled by an insert molding method so as to prevent the shape of a damper from being changed, and the damper, cap, and socket may be coupled to each other according to various embodiments described below in order to increase a vibration isolation performance of the cable anchoring device.

A process in which a rib is formed in the cap and is coupled to the damper in accordance with various embodiments will be described with reference to FIGS. 1 to 15.

Figure 2:
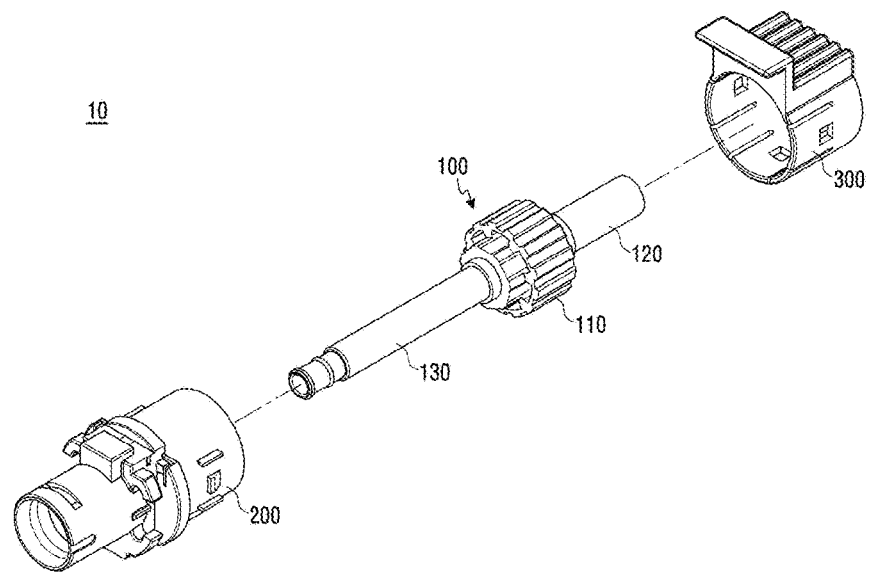
FIG. 2 is an exploded perspective view of the cable anchoring device according to one embodiment, as viewed from one side of the cable anchoring device.
Figure 3:
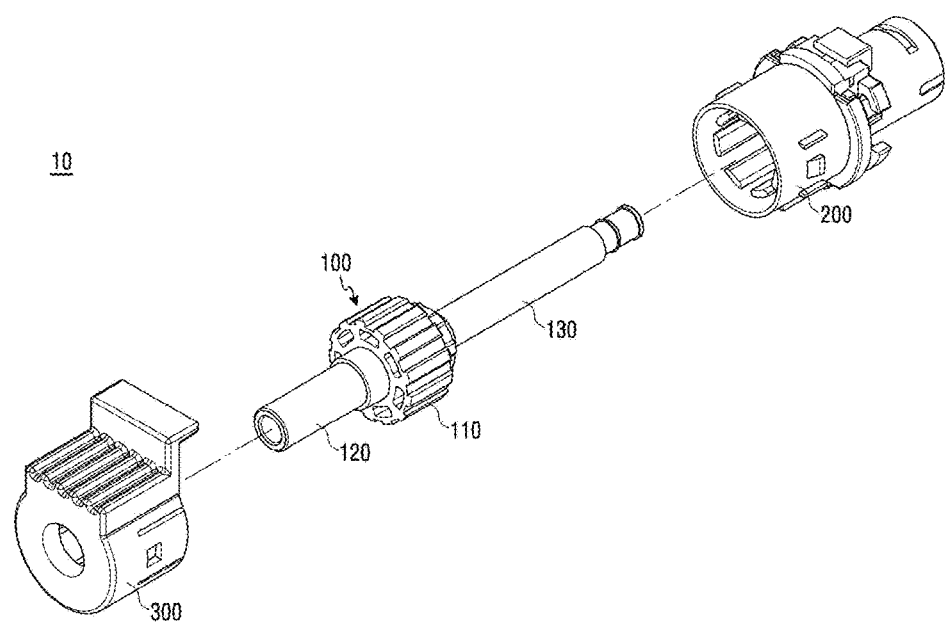
FIG. 3 is an exploded perspective view of the cable anchoring device according to one embodiment, as viewed from another side of the cable anchoring device.

FIG. 1 is a perspective view of a cable anchoring device according to a first embodiment. FIG. 2 is an exploded perspective view of the cable anchoring device according to the first embodiment as viewed from one side of the cable anchoring device. FIG. 3 is an exploded perspective view of the cable anchoring device according to the first embodiment as viewed from another side of the cable anchoring device.

Referring to FIGS. 1 to 3, a cable anchoring device 10 includes a vibration isolation member 100, a guide pipe 130, a socket 200, and a cap 300.

Figure 4:
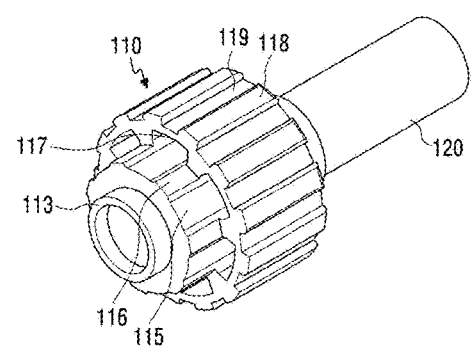
FIG. 4 is a perspective view showing a vibration isolation member, according to a first embodiment.
Figure 5:
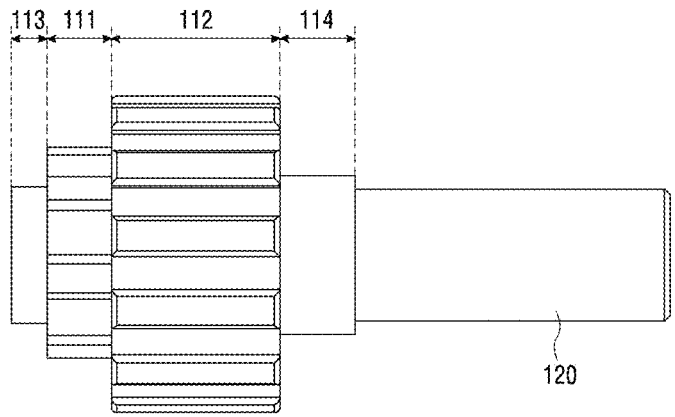
FIG. 5 is a side view showing the vibration isolation member, according to the first embodiment.
Figure 6:
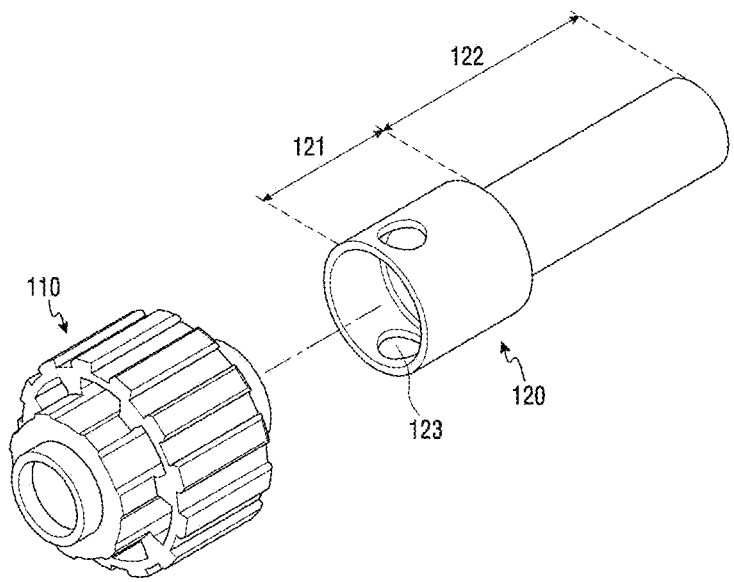
FIG. 6 is an exploded perspective view showing a vibration isolation member, according to the first embodiment.

FIGS. 4 to 6 are views showing a vibration isolation member according to the first embodiment. Specifically, FIG. 4 is a perspective view of the vibration isolation member. FIG. 5 is a side view of the vibration isolation member as viewed from the side thereof. FIG. 6 is an exploded perspective view of a damper and a cup as viewed from one side.

Referring to FIGS. 4 to 6, the vibration isolation member 100 includes the damper 110 and the cup 120.

The damper 110 may be made of a resin material and may include a first damper body 111, a second damper body 112, a first damper neck 113, and a second damper neck 114. The first damper body 111 and the second damper body 112 may be integrally formed with each other.

The first damper body 111 is formed to have a cylindrical shape having a diameter less than that of the second damper body 112, and has at least one first damper projection 115 and at least one first damper groove 116 which are formed along the outer circumferential surface of the first damper body 111. The first cylindrical damper neck 113 is formed on the front of the first damper body 111. A cable may pass through the first damper neck 113.

The second damper body 112 is formed to have a cylindrical shape having a diameter larger than that of the first damper body 111, and has at least one second damper projection 118 and at least one second damper groove 119 which are formed along the outer circumferential surface of the second damper body 112 in a longitudinal direction of the second damper body 112. At least one damper hole 117 is formed along the inner circumferential surface of the second damper body 112. The damper hole 117 passes through the second damper body 112 from the front to rear of the second damper body 112 in a longitudinal direction of the second damper body 112. The damper hole 117 may be disposed on the inner circumferential surface of the second damper body 112 at a position corresponding to the position of the first damper projection 115 formed on the outer circumferential surface of the first damper body 111. The damper hole 117 may have a size to include a void 500 in a state where a below-described socket rib 213 of the socket 200 is inserted into the damper hole 117.

The second cylindrical shaped damper neck 114 is formed on the rear of the second damper body 112. The second damper neck 114 may pass through a below-described second cup body 122 of the cup 120.

The cup 120 may be made of a high rigid material in order to prevent the damper from being transformed, or may be made of a metallic material. The cup 120 may be formed to have a cylindrical shape and may include a first cup body 121 and the second cup body 122.

The first cup body 121 may include a front support surface 400, a rear support surface 401, and an outer circumferential support surface 402. Specifically, when the first cup body 121 and the second cup body 122 are formed to have a cylindrical shape, the front support surface 400 and the rear support surface 401 may be formed to have a circular shape, and the outer circumferential support surface 402 may be formed on the outer surface of the first cup body 121 and may be formed between the front support surface 400 and the rear support surface 401. The diameter of the first cup body 121 may be larger than that of the second cup body 122.

At least one cup hole 123 may be formed on the outer surface of the first cup body 121. This cup hole 123 may be formed to have a circular shape. Alternatively, the cup hole 123 may have various shapes. Here, the size of the cup hole 123 and/or the number of the cup holes 123 may be determined such that the rigidity of the first cup body 121 can be maintained above a predetermined level.

The second cup body 122 may be formed to have a cylindrical shape having a diameter less than that of the first cup body 121 and allows the cable to pass therethrough.

Figure 7:
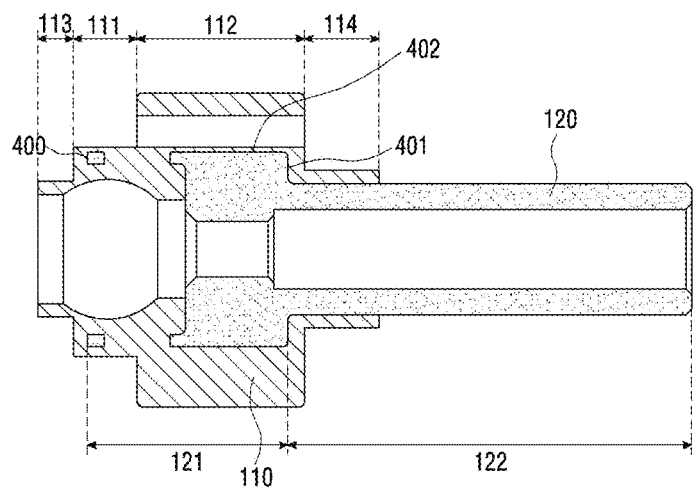
FIG. 7 is a cross-sectional view of the vibration isolation member, according to the first embodiment.

FIG. 7 is a cross-sectional view of the vibration isolation member, according to the first embodiment.

Referring to FIG. 7, in the vibration isolation member 100, the first cup body 121 of the cup 120 may be inserted within the damper 110 and they may be coupled by an insert molding method. The insert molding method may include a curing process. Through the curing process, the elasticity of the damper 110 is increased and the cup 120 and the damper 110 can be integrally formed and bonded together. When the damper 110 and the first cup body 121 of the cup 120 are insert-molded, the resin-made damper 110 is formed within the cup hole 123 formed in the first cup body 121 of the cup 120, so that the vibration isolation performance toward the center from the outer circumferential surface of the damper 110 can be increased.

The guide pipe 130 may be formed to have a cylindrical tubular shape. A core (not shown) of a control cable (not shown) is inserted and pushed into the inside of the guide pipe 130. The diameter of the guide pipe 130 is less than the inner diameter of the socket 200 and is inserted into the socket 200.

Figure 8:
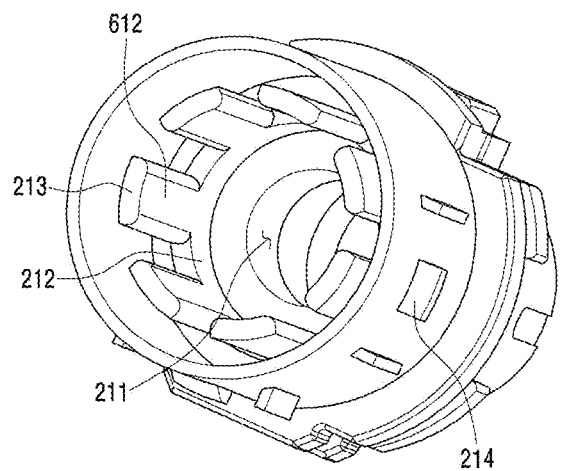
FIG. 8 is a perspective view of a socket, according to the first embodiment.
Figure 9:
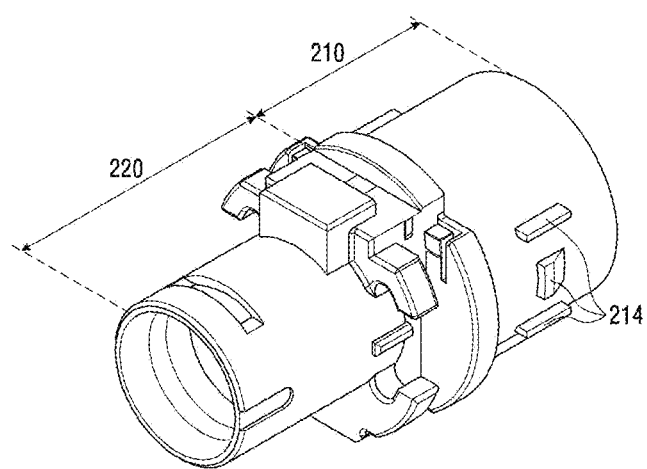
FIG. 9 is another perspective view of the socket, according to the first embodiment.
Figure 10:
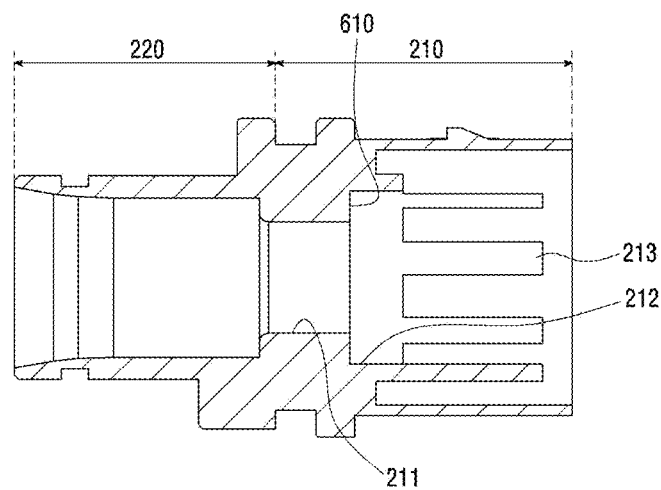
FIG. 10 is a cross-sectional view of the socket, according to the first embodiment.

FIGS. 8 to 10 are views showing a socket according to the first embodiment. Specifically, FIG. 8 is a perspective view of the socket as viewed from one side. FIG. 9 is another perspective view of the socket as viewed from another side. FIG. 10 is a cross-sectional view of the socket.

Referring to FIGS. 8 to 10, the socket 200 is formed to have a cylindrical shape and includes a first socket body 210 and a second socket body 220.

The diameter of the first socket body 210 may be larger than that of the second socket body 220 and may be formed to have a cylindrical shape surrounding the vibration isolation member 100. Specifically, a socket through-hole 211 through which the guide pipe 130 passes may be formed in the first socket body 210. A socket inner surface 610 and a cylindrical socket projection 212 may be formed on the inner surface of the first socket body 210 in which the socket through-hole 211 is formed. The socket rib 213 may be formed on one side of the socket projection 212.

The socket through-hole 211 has a diameter allowing the first damper neck 113 to be inserted thereinto. Therefore, since the first damper neck 113 is inserted into the socket through-hole 211, the vibration isolation member 100 and the socket 200 can be completely coupled to each other.

The socket projection 212 has a diameter allowing the first damper body 111 to be inserted thereinto.

At least one socket rib 213 may be provided and the number of the socket ribs 213 may be the same as the number of the damper holes 117. The socket ribs 213 may be disposed along a circular periphery in such a manner as to correspond to the position of the damper hole 117. The socket rib 213 has a size for allowing itself to be inserted into the damper hole 117. Also, a socket rib inner surface 612 may be formed on the socket rib 213. As a result, the vibration isolation member 100 and the socket 200 can be completely coupled to each other.

At least one locking projection 214 may be formed at a predetermined interval on a portion of the outer circumferential surface of the first socket body 210. This locking projection 214 may be formed to have a shape corresponding to a below-described locking groove 301 of the cap 300. Therefore, the locking projection 214 formed on the outer circumferential surface of the first socket body 210 is locked to the locking groove 301 of the cap 300, so that the first socket body 210 of the socket 200 may be inserted into the cap 300.

The second socket body 220 may be formed to have a cylindrical shape having a diameter less than that of the first socket body 210.

Figure 11:
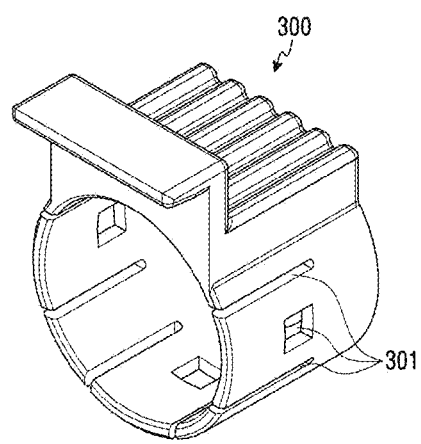
FIG. 11 is a perspective view of a cap according to the first embodiment.
Figure 12:
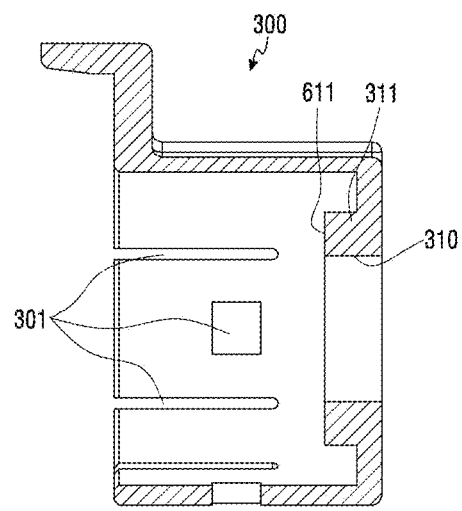
FIG. 12 is a cross-sectional view of the cap, according to the first embodiment.

FIGS. 11 and 12 are views showing a cap according to the first embodiment. Specifically, FIG. 11 is a perspective view of the cap as viewed from one side. FIG. 12 is a cross-sectional view of the cap.

Referring to FIGS. 11 and 12, the cap 300 may be formed to have a cylindrical shape surrounding the first socket body 210 of the socket 200. At least one locking groove 301 may be formed at a predetermined interval on a portion of the outer circumferential surface of the cap 300. Specifically, the locking groove 301 may be formed to have a shape allowing the locking projection 214 formed on the outer circumferential surface of the first socket body 210 of the socket 200 to be inserted thereinto.

A hole 310 may be formed on one side of the cap 300. The hole 310 has a diameter less than the inner diameter of the cap 300. The vibration isolation member 100 may be inserted into the hole 310. A cylindrical cap projection 311 which projects toward the inside of the cap 300 may be formed on the inner surface of the cap 300 in which the hole 310 is formed. Also, a cup inner surface 611 may be formed on the cap projection 311.

Figure 13:
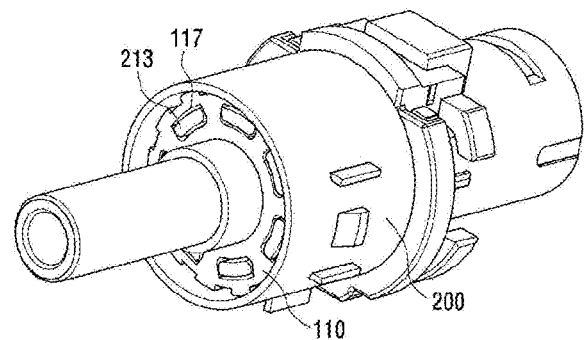
FIG. 13 is a perspective view of the vibration isolation member and the socket coupled to each other, according to the first embodiment.
Figure 14:
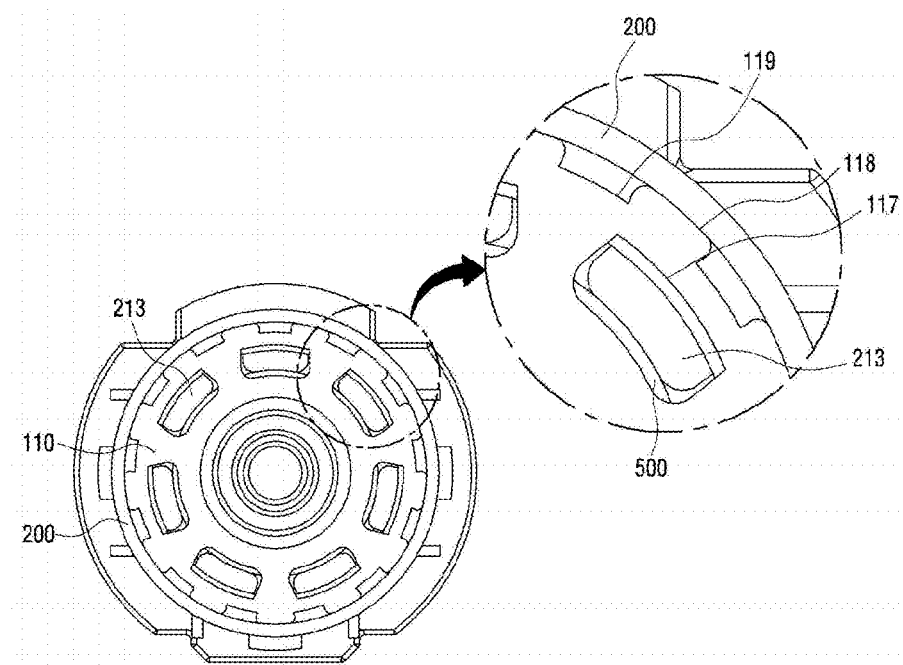
FIG. 14 is a front view of the vibration isolation member and the socket coupled to each other, according to first embodiment.

FIGS. 13 and 14 are views for describing a process in which the vibration isolation member and the socket are coupled in accordance with the first embodiment.

Specifically, FIG. 13 is a perspective view of the vibration isolation member and the socket coupled to each other as viewed from a side thereof. FIG. 14 is a front view of the vibration isolation member and the socket coupled to each other as viewed from a front thereof.

Referring to FIGS. 13 and 14, the vibration isolation member 100 and the socket 200 may be coupled to each other by inserting the socket rib 213 of the socket 200 into the damper hole 117.

When the socket rib 213 of the socket 200 is inserted into the damper hole 117, the void 500 may be formed in the damper hole 117. Therefore, even when vibration is transferred to the cable anchoring device 10 toward the center from the outer circumferential surface of the damper 110, a contact area between the damper hole 117 of the damper 110 and the socket rib 213 of the socket 200 is reduced by the void 500, so that the vibration isolation performance can be increased. Also, since a contact area between the damper 110 and the socket 200 is reduced by the second damper projection 118 and the second damper groove 119 which are formed along the outer circumferential surface of the damper 110 inserted into the first socket body 210, the vibration isolation performance can be increased.

Figure 15:
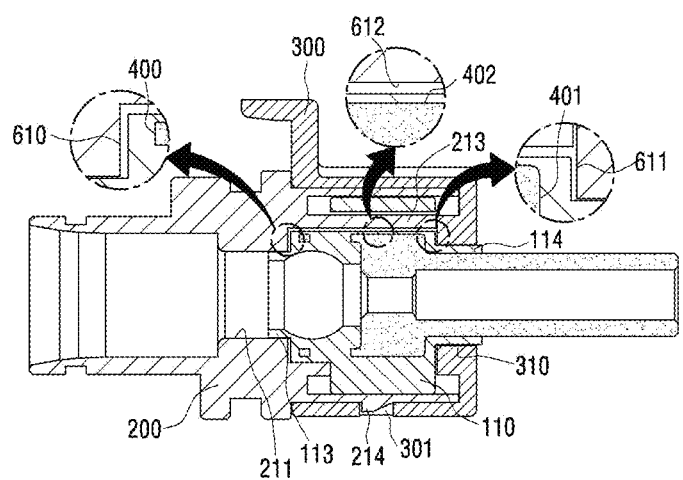
FIG. 15 is a cross-sectional view of the vibration isolation member, socket, and cap coupled to each other, according to the first embodiment.

FIG. 15 is a cross-sectional view of the vibration isolation member, socket, and cap coupled to each other, according to the first embodiment.

Referring to FIG. 15, the damper hole 117 formed in the first damper body 111 of the damper 110 and the socket rib 213 formed on the first socket body 210 of the socket 200 are placed at the same position in the longitudinal direction of the vibration isolation member 100. When the socket rib 213 is inserted into the damper hole 117 and the first damper neck 113 of the damper 110 is inserted into the socket through-hole 211 of the socket 200, the vibration isolation member 100 is fully inserted into the socket 200.

In a state where the vibration isolation member 100 is inserted into the socket 200, the first socket body 210 of the socket 200 is inserted into the cap 300. Here, the second damper neck 114 of the damper 110 may be inserted into the hole 310 of the cap 300, and the locking projection 214 formed on the outer circumferential surface of the first socket body 210 of the socket 200 may be locked to the locking groove 301 of the cap 300.

Here, when an external force is applied to the front of the vibration isolation member 100, an excessive force which is transferred to the damper 110 can be blocked because the front support surface 400 of the first cup body 121 is very close to and faces the socket inner surface 610 of the first socket body 210. Therefore, the forward movement of the damper 110 can be reduced, and thus, the shape of the damper 110 can be prevented from being transformed. Likewise, when an external force is applied to the rear of the vibration isolation member 100, an excessive force which is transferred to the damper 110 can be blocked because the rear support surface 401 of the first cup body 121 is very close to and faces the cup inner surface 611 of the cap 300. Therefore, the backward movement of the damper 110 can be reduced, and thus, the shape of the damper 110 can be prevented from being transformed. Also, when a force is transferred in a direction perpendicular to the longitudinal direction of the cable anchoring device 10, an excessive force which is transferred to the damper 110 can be blocked because the outer circumferential support surface 402 of the first cup body 121 is very close to and faces the socket rib inner surface 612 of the socket rib 213. Therefore, the shape of the damper 110 can be prevented from being transformed.

Specifically, when the first cup body 121 is formed to have a cylindrical shape, the diameter of the first cup body 121 may be larger than the diameter of the socket through-hole 211 formed in the socket 200 and the diameter of the hole formed in the cap 300. Therefore, even when an external force is applied to the cable anchoring device 10 in the longitudinal direction of the cable anchoring device 10 or in a direction perpendicular to the longitudinal direction of the cable anchoring device 10, the movement of the damper 110 can be reduced, and thus, the shape of the damper 110 can be prevented from being transformed.

Figure 16:
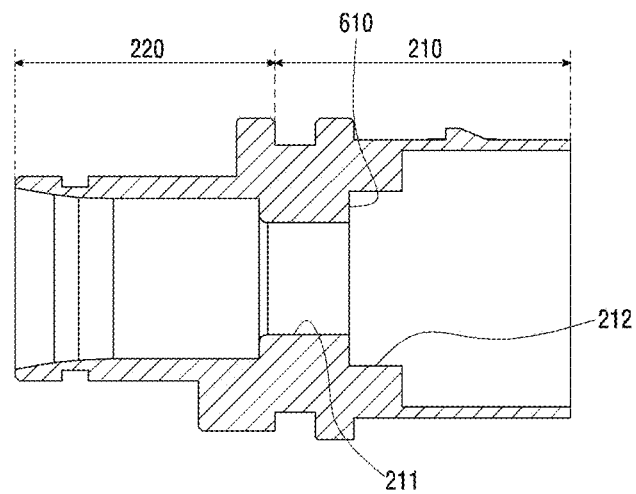
FIG. 16 is a cross-sectional view of the socket, according to a second embodiment.
Figure 17:
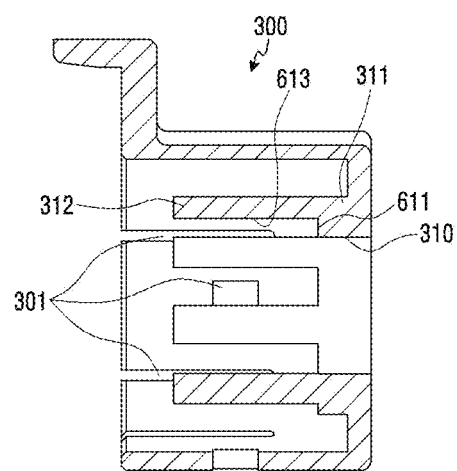
FIG. 17 is a cross-sectional view of the cap, according to the second embodiment.
Figure 18:
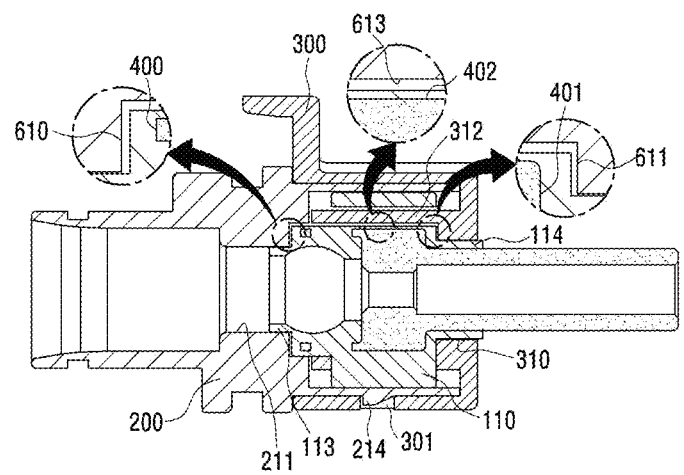
FIG. 18 is a cross-sectional view of the vibration isolation member, the socket, and the cap coupled to each other, according to the second embodiment.

FIGS. 16 to 18 are views for describing the rib formed in the cap coupled to the damper in accordance with the second embodiment.

FIG. 16 is a cross-sectional view of the socket.

Referring to FIG. 16, the socket 200 is formed to have a cylindrical shape and includes the first socket body 210 and the second socket body 220.

The first socket body 210 may be formed to have a shape having a diameter larger than that of the second socket body 220 and surround the vibration isolation member 100. Specifically, the socket through-hole 211 through which the guide pipe 130 passes may be formed in the first socket body 210. The socket inner surface 610 and the cylindrical socket projection 212 may be formed on the inner surface of the first socket body 210 in which the socket through-hole 211 is formed. The socket rib 213 may be formed on one side of the socket projection 212.

The socket through-hole 211 has a diameter allowing the first damper neck 113 to be inserted thereinto. Therefore, since the first damper neck 113 is inserted into the socket through-hole 211, the vibration isolation member 100 and the socket 200 can be completely coupled to each other.

The socket projection 212 has a diameter allowing the first damper body 111 to be inserted thereinto.

At least one locking projection 214 may be formed at a predetermined interval on a portion of the outer circumferential surface of the first socket body 210. This locking projection 214 may be formed to have a shape corresponding to a below-described locking groove 301 of the cap 300. Therefore, the locking projection 214 formed on the outer circumferential surface of the first socket body 210 is locked to the locking groove 301 of the cap 300, so that the first socket body 210 of the socket 200 may be inserted into the cap 300.

The second socket body 220 may be formed to have a cylindrical shape having a diameter less than that of the first socket body 210.

FIG. 17 is a cross-sectional view of the cap.

Referring to FIG. 17, the cap 300 may be formed to have a cylindrical shape surrounding the first socket body 210 of the socket 200. At least one locking groove 301 may be formed at a predetermined interval on a portion of the outer circumferential surface of the cap 300. Specifically, the locking groove 301 may be formed to have a shape allowing the locking projection 214 formed on the outer circumferential surface of the first socket body 210 of the socket 200 to be inserted thereinto.

The hole 310 may be formed on one side of the cap 300. The hole 310 has a diameter less than the inner diameter of the cap 300. The vibration isolation member 100 may be inserted into the hole 310. The cylindrical cap projection 311 which projects toward the inside of the cap 300 may be formed on the inner surface of the cap 300 in which the hole 310 is formed. Also, the cup inner surface 611 may be formed on the cap projection 311.

A cap rib 312 may be formed on one side of the cap projection 311.

At least one cap rib 312 may be formed and the number of the cap ribs 312 may be the same as the number of the damper holes 117. The cap rib 312 may be disposed along a circular periphery in such a manner as to correspond to the position of the damper hole 117. The socket rib 213 has a size for allowing itself to be inserted into the damper hole 117. Also, a cap rib inner surface 613 may be formed on the cap rib 312. As a result, the vibration isolation member 100 and the socket 200 can be completely coupled to each other.

FIG. 18 is a cross-sectional view of the vibration isolation member, the socket, and the cap coupled to each other.

Referring to FIG. 18, the damper hole 117 formed in the first damper body 111 of the damper 110 and the cap rib 312 formed within the cap 300 are placed at the same position in the longitudinal direction of the vibration isolation member 100. When the cap rib 312 is inserted into the damper hole 117 and the second damper neck 114 of the damper 110 is inserted into the hole 310 of the cap 300, the vibration isolation member 100 is fully inserted into the cap 300.

In a state where the vibration isolation member 100 is inserted into the cap 300, the first socket body 210 of the socket 200 is inserted into the cap 300. Here, the first damper neck 113 of the damper 110 may be inserted into socket through-hole 211 of the socket 200, and the locking projection 214 formed on the outer circumferential surface of the first socket body 210 of the socket 200 may be locked to the locking groove 301 of the cap 300.

Here, when an external force is applied to the front of the vibration isolation member 100, an excessive force which is transferred to the damper 110 can be blocked because the front support surface 400 of the first cup body 121 is very close to and faces the socket inner surface 610 of the first socket body 210. Therefore, the forward movement of the damper 110 can be reduced, and thus, the shape of the damper 110 can be prevented from being transformed. Likewise, when an external force is applied to the rear of the vibration isolation member 100, an excessive force which is transferred to the damper 110 can be blocked because the rear support surface 401 of the first cup body 121 is very close to and faces the cup inner surface 611 of the cap 300. Therefore, the backward movement of the damper 110 can be reduced, and thus, the shape of the damper 110 can be prevented from being transformed. Also, when a force is transferred in a direction perpendicular to the longitudinal direction of the cable anchoring device 10, an excessive force which is transferred to the damper 110 can be blocked because the outer circumferential support surface 402 of the first cup body 121 is very close to and faces the cap rib inner surface 613 of the cap rib 312. Therefore, the shape of the damper 110 can be prevented from being transformed.

FIGS. 19 to 22 are views of the rib formed in both the socket and cap coupled to the damper in accordance with the third embodiment.

Figure 19:
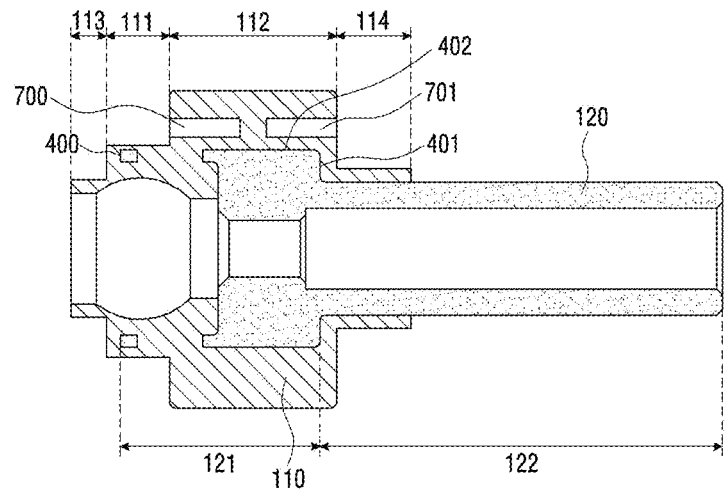
FIG. 19 is a cross-sectional view of the vibration isolation member, according to a third embodiment.

FIG. 19 is a cross-sectional view of the vibration isolation member.

Referring to FIG. 19, the vibration isolation member 100 includes the damper 110 and the cup 120.

The damper 110 may include the first damper body 111, the second damper body 112, the first damper neck 113, and the second damper neck 114. The first damper body 111 and the second damper body 112 may be integrally formed with each other.

The first damper body 111 is formed to have a cylindrical shape having a diameter less than that of the second damper body 112 and has at least one damper projection and at least one damper groove which are formed along the outer circumferential surface of the first damper body 111. The first cylindrical damper neck 113 is formed on the front of the first damper body 111. A cable may pass through the first damper neck 113.

The second damper body 112 is formed to have a cylindrical shape having a diameter larger than that of the first damper body 111 and has at least one damper projection and at least one damper groove which are formed along the outer circumferential surface of the second damper body 112 in a longitudinal direction of the second damper body 112. The second damper body 112 has a first damper rib groove 700 and a second damper rib groove 701. The first damper rib groove 700 has a certain length from the front to rear of the second damper body 112 in a longitudinal direction of the second damper body 112. The second damper rib groove 701 has a certain length from the rear to front of the second damper body 112 in a longitudinal direction of the second damper body 112. The first damper rib groove 700 and the second damper rib groove 701 may be disposed in a circular form at a position corresponding to the position of the damper projection formed on the outer circumferential surface of the first damper body 111. The first damper rib groove 700 and the second damper rib groove 701 may have a size to include a void in a state where the below-described socket rib 213 of the socket 200 and the cap rib 312 of the cap 300 have been inserted into the first damper rib groove 700 and the second damper rib groove 701 respectively.

The second cylindrical shaped damper neck 114 is formed on the rear of the second damper body 112. The second damper neck 114 may pass through the below-described second cup body 122 of the cup 120.

The cup 120 may be made of a high rigid material in order to prevent the damper from being transformed, or may be made of a metallic material. The cup 120 may be formed to have a cylindrical shape and may include the first cup body 121 and the second cup body 122.

The first cup body 121 may include a front support surface 400, a rear support surface 401, and an outer circumferential support surface 402. Specifically, when the first cup body 121 and the second cup body 122 are formed to have a cylindrical shape, the front support surface 400 and the rear support surface 401 may be formed to have a circular shape, and the outer circumferential support surface 402 may be formed on the outer surface of the first cup body 121 and may be between the front support surface 400 and the rear support surface 401. The diameter of the first cup body 121 may be larger than that of the second cup body 122.

At least one cup hole may be formed on the outer surface of the first cup body 121. This cup hole may be formed to have a circular shape and may have various shapes including the circular shape. Here, the size of the cup hole and/or the number of the cup holes formed in the first cup body 121 may be determined such that the required rigidity of the first cup body 121 is sufficiently maintained.

The second cup body 122 may be formed to have a cylindrical shape having a diameter less than that of the first cup body 121 and allows the cable to pass therethrough.

Figure 20:
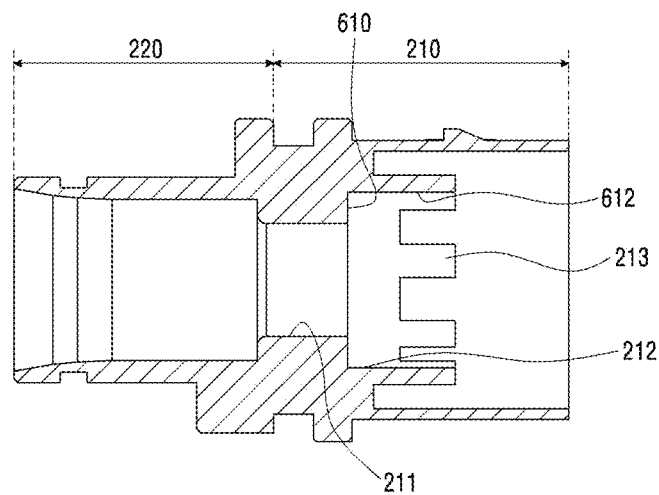
FIG. 20 is a cross-sectional view of the socket, according to the third embodiment.

FIG. 20 is a cross-sectional view of the socket.

Referring to FIG. 20, the socket 200 is formed to have a cylindrical shape and includes the first socket body 210 and the second socket body 220.

The first socket body 210 may be formed to have a shape having a diameter larger than that of the second socket body 220 and surround the vibration isolation member 100. Specifically, the socket through-hole 211 through which the guide pipe 130 passes may be formed in the first socket body 210. The socket inner surface 610 and the cylindrical socket projection 212 may be formed on the inner surface of the first socket body 210 in which the socket through-hole 211 is formed. The socket rib 213 may be formed on one side of the socket projection 212. The socket rib 213 may be formed on one side of the socket projection 212.

The socket through-hole 211 has a diameter allowing the first damper neck 113 to be inserted thereinto. Therefore, since the first damper neck 113 is inserted into the socket through-hole 211, the vibration isolation member 100 and the socket 200 can be completely coupled to each other.

The socket projection 212 has a diameter allowing the first damper body 111 to be inserted thereinto.

At least one socket rib 213 may be provided and the number of the socket ribs 213 may be the same as the number of the damper holes 117. The socket ribs 213 may be disposed along a circular perimeter in such a manner as to correspond to the position of the first damper rib groove 700. The socket rib 213 has a size for allowing itself to be inserted into the first damper rib groove 700. Also, the socket rib inner surface 612 may be formed on the socket rib 213. As a result, the vibration isolation member 100 and the socket 200 can be completely coupled to each other.

At least one locking projection 214 may be formed at a predetermined interval on a portion of the outer circumferential surface of the first socket body 210. This locking projection 214 may be formed to have a shape corresponding to a below-described locking groove 301 of the cap 300. Therefore, the locking projection 214 formed on the outer circumferential surface of the first socket body 210 is locked to the locking groove 301 of the cap 300, so that the first socket body 210 of the socket 200 may be inserted into the cap 300.

The second socket body 220 may be formed to have a cylindrical shape having a diameter less than that of the first socket body 210.

Figure 21:
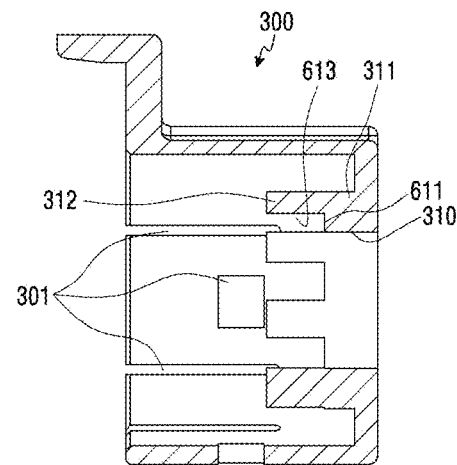
FIG. 21 is a cross-sectional view of the cap, according to the third embodiment.

FIG. 21 is a cross-sectional view of the cap.

Referring to FIG. 21, the cap 300 may be formed to have a cylindrical shape surrounding the first socket body 210 of the socket 200. At least one locking groove 301 may be formed at a predetermined interval on a portion of the outer circumferential surface of the cap 300. Specifically, the locking groove 301 may be formed to have a shape allowing the locking projection 214 formed on the outer circumferential surface of the first socket body 210 of the socket 200 to be inserted thereinto.

The hole 310 may be formed on one side of the cap 300. The hole 310 has a diameter less than the inner diameter of the cap 300. The vibration isolation member 100 may be inserted into the hole 310. A cylindrical cap projection 311 which projects toward the inside of the cap 300 may be formed on the inner surface of the cap 300 in which the hole 310 is formed. Also, a cup inner surface 611 may be formed on the cap projection 311. As a result, the socket 200 and the cap 300 to which the vibration isolation member 100 has been coupled can be completely coupled to each other.

The cap rib 312 may be formed on one side of the cap projection 311.

At least one cap rib 312 may be formed and the number of the cap ribs 312 may be the same as the number of the damper holes 117. The cap rib 312 may be disposed along a circular periphery in such a manner as to correspond to the position of the second damper rib groove 701. The socket rib 213 has a size for allowing itself to be inserted into the second damper rib groove 701. Also, a cap rib inner surface 613 may be formed on the cap rib 312. As a result, the vibration isolation member 100 and the socket 200 can be completely coupled to each other.

Figure 22:
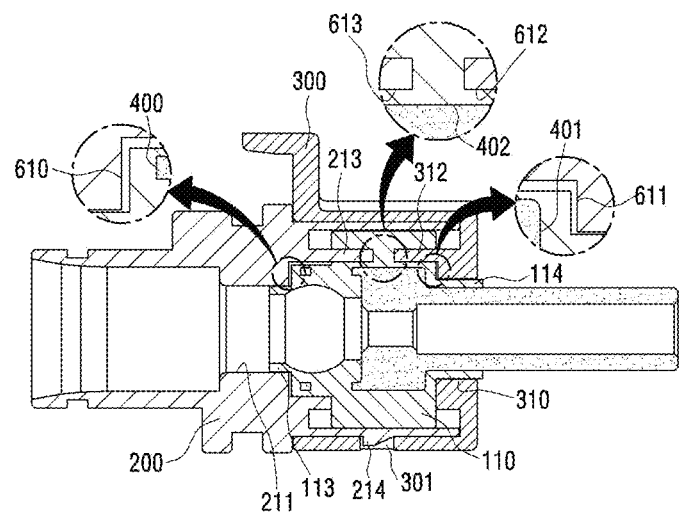
FIG. 22 is a cross-sectional view of the vibration isolation member, the socket, and the cap coupled to each other, according to the third embodiment.

FIG. 22 is a cross-sectional view of the vibration isolation member, the socket, and the cap coupled to each other.

Referring to FIG. 22, the first damper rib groove 700 formed in the first damper body 111 of the damper 110 and the socket rib 213 formed on the first socket body 210 of the socket 200 are placed at the same position in the longitudinal direction of the vibration isolation member 100. When the socket rib 213 is inserted into the first damper rib groove 700 and the first damper neck 113 of the damper 110 is inserted into the socket through-hole 211 of the socket 200, the vibration isolation member 100 is fully inserted into the socket 200.

In the state where the vibration isolation member 100 is inserted into the cap 300, the second damper rib groove 701 formed in the first damper body 111 of the damper 110 and the cap rib 312 formed within the cap 300 are placed at the same position in the longitudinal direction of the vibration isolation member 100. When the cap rib 312 is inserted into the second damper rib groove 701 and the second damper neck 114 of the damper 110 is inserted into the hole 310 of the cap 300, the vibration isolation member 100 is fully inserted into the cap 300. Here, the locking projection 214 formed on the outer circumferential surface of the first socket body 210 of the socket 200 may be locked to the locking groove 301 of the cap 300.

Here, when an external force is applied to the front of the vibration isolation member 100, an excessive force which is transferred to the damper 110 can be blocked because the front support surface 400 of the first cup body 121 is very close to and faces the socket inner surface 610 of the first socket body 210. Therefore, the forward movement of the damper 110 can be reduced, and thus, the shape of the damper 110 can be prevented from being transformed. Likewise, when an external force is applied to the rear of the vibration isolation member 100, an excessive force which is transferred to the damper 110 can be blocked because the rear support surface 401 of the first cup body 121 is very close to and faces the cup inner surface 611 of the cap 300. Therefore, the backward movement of the damper 110 can be reduced, and thus, the shape of the damper 110 can be prevented from being transformed. Also, when a force is transferred in a direction perpendicular to the longitudinal direction of the cable anchoring device 10, an excessive force which is transferred to the damper 110 can be blocked because the outer circumferential support surface 402 of the first cup body 121 is very close to and faces both the socket rib inner surface 612 of the socket rib 213 and the cap rib inner surface 613 of the cap rib 312. Therefore, the shape of the damper 110 can be prevented from being transformed.

FIGS. 23 to 28 are views of both the socket and cap coupled to the damper in accordance with the fourth embodiment.

Figure 23:
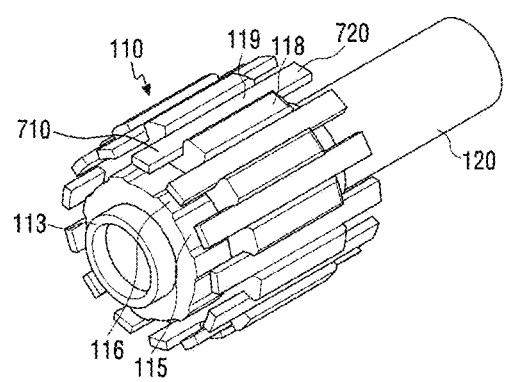
FIG. 23 is a perspective view of the vibration isolation member, according to a fourth embodiment.
Figure 24:
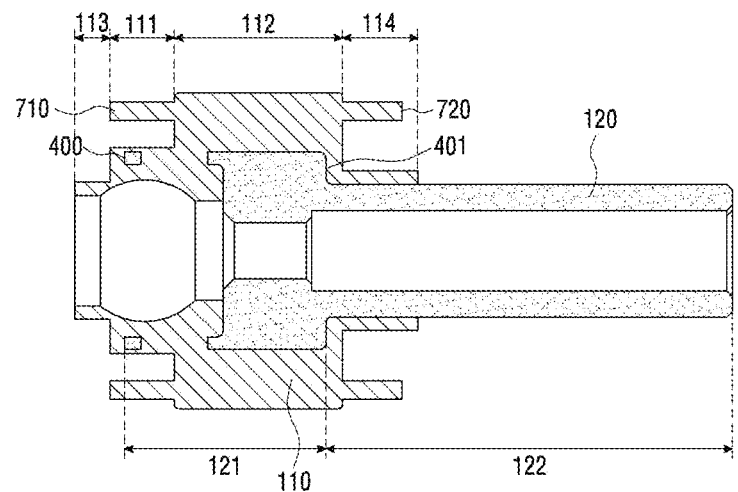
FIG. 24 is a cross-sectional view of the vibration isolation member, according to the fourth embodiment.

FIG. 23 is a perspective view of the vibration isolation member as viewed from the front thereof. FIG. 24 is a cross-sectional view of the vibration isolation member.

Referring to FIGS. 23 and 24, the damper 110 may include the first damper body 111, the second damper body 112, the first damper neck 113, and the second damper neck 114. The first damper body 111 and the second damper body 112 may be integrally formed with each other.

The first damper body 111 is formed to have a cylindrical shape having a diameter less than that of the second damper body 112, and has at least one first damper projection 115 and at least one first damper groove 116 which are formed along the outer circumferential surface of the first damper body 111. The first cylindrical damper neck 113 is formed on the front of the first damper body 111. A cable may pass through the first damper neck 113.

The second damper body 112 is formed to have a cylindrical shape having a diameter larger than that of the first damper body 111 and has at least one second damper projection 118 and at least one second damper groove 119 which are formed along the outer circumferential surface of the second damper body 112 in a longitudinal direction of the second damper body 112. Also, a first damper rib 710 and a second damper rib 720 are formed in the front and rear of the second damper body 112 in correspondence to the position of the second damper groove 119.

At least one first damper rib 710 and at least one second damper rib 720 may be provided. The numbers of the first and second damper ribs 710 and 720 may be the same as the number of the second damper groove 119. The first and second damper ribs 710 and 720 may be disposed along a circular periphery in such a manner as to correspond to the position of the second damper groove 119. The first damper rib 710 has a size for allowing itself to be inserted into a socket inner groove 711. Also, the second damper rib 720 has a size for allowing itself to be inserted into a cap inner groove 721.

The second cylindrical shaped damper neck 114 is formed on the rear of the second damper body 112. The second damper neck 114 may pass through the below-described second cup body 122 of the cup 120.

The cup 120 may be made of a high rigid material in order to prevent the damper from being transformed, or may be made of a metallic material. The cup 120 may be formed to have a cylindrical shape and may include the first cup body 121 and the second cup body 122.

The first cup body 121 may include the front support surface 400, the rear support surface 401, and the outer circumferential support surface 402. Specifically, when the first cup body 121 and the second cup body 122 are formed to have a cylindrical shape, the front support surface 400 and the rear support surface 401 may be formed to have a circular shape, and the outer circumferential support surface 402 may be formed on the outer surface of the first cup body 121 and may be between the front support surface 400 and the rear support surface 401. The diameter of the first cup body 121 may be larger than that of the second cup body 122.

At least one cup hole 123 may be formed on the outer surface of the first cup body 121. This cup hole 123 may be formed to have a circular shape. Alternatively, the cup hole 123 may have various shapes. Here, the size of the cup hole 123 and/or the number of the cup holes 123 formed in the first cup body 121 may be determined such that the rigidity of the first cup body 121 can be maintained above a predetermined level.

The second cup body 122 may be formed to have a cylindrical shape having a diameter less than that of the first cup body 121 and allows the cable to pass therethrough.

Figure 25:
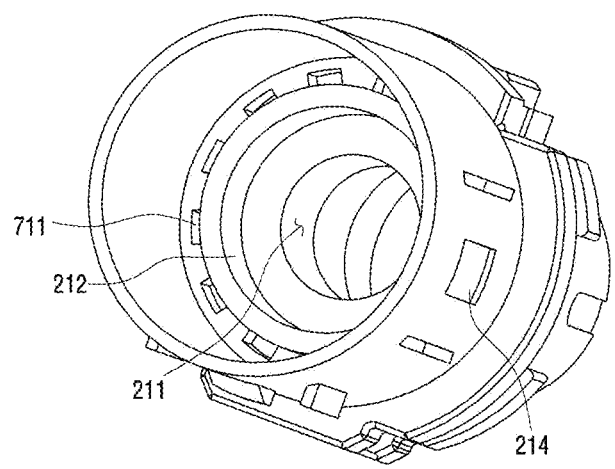
FIG. 25 is a perspective view of the socket, according to the fourth embodiment.
Figure 26:
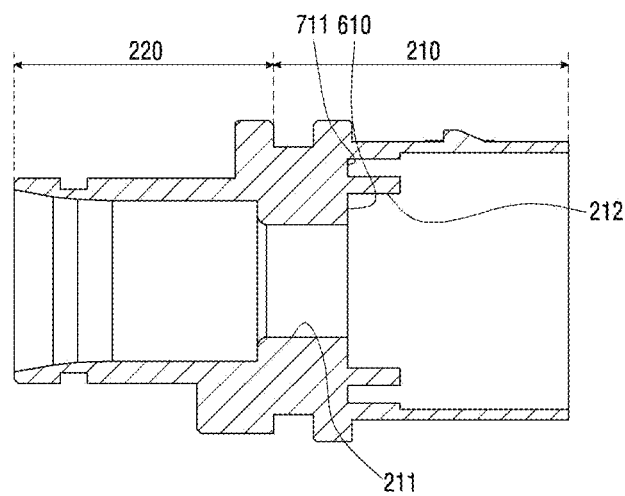
FIG. 26 is a cross-sectional view of the socket, according to the fourth embodiment.

FIG. 25 is a perspective view of the socket as viewed from one side. FIG. 26 is a cross-sectional view of the socket.

Referring to FIGS. 25 and 26, the socket 200 is formed to have a cylindrical shape and includes the first socket body 210 and the second socket body 220.

The first socket body 210 may be formed to have a shape having a diameter larger than that of the second socket body 220 and surround the vibration isolation member 100. Specifically, the socket through-hole 211 through which the guide pipe 130 passes may be formed in the first socket body 210. The socket inner surface 610 and the cylindrical socket projection 212 may be formed on the inner surface of the first socket body 210 in which the socket through-hole 211 is formed. The socket rib 213 may be formed on one side of the socket projection 212.

The socket through-hole 211 has a diameter allowing the first damper neck 113 to be inserted thereinto. Therefore, since the first damper neck 113 is inserted into the socket through-hole 211, the vibration isolation member 100 and the socket 200 can be completely coupled to each other.

The socket projection 212 has a diameter allowing the first damper body 111 to be inserted thereinto.

The socket inner groove 711 into which the first damper rib 710 is inserted may be formed between the inner surface of the first socket body 210 and the socket projection 212. The socket inner groove 711 may be disposed along a circular periphery in such a manner as to correspond to the position of the first damper rib 710. The socket inner groove 711 may have a size to include a void in a state where the first damper rib 710 has been inserted into the socket inner groove 711.

At least one locking projection 214 may be formed at a predetermined interval on a portion of the outer circumferential surface of the first socket body 210. This locking projection 214 may be formed to have a shape corresponding to a below-described locking groove 301 of the cap 300. Therefore, the locking projection 214 formed on the outer circumferential surface of the first socket body 210 is locked to the locking groove 301 of the cap 300, so that the first socket body 210 of the socket 200 may be inserted into the cap 300.

The second socket body 220 may be formed to have a cylindrical shape having a diameter less than that of the first socket body 210.

Figure 27:
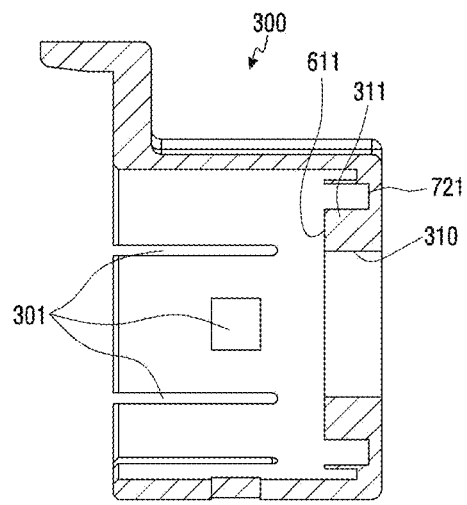
FIG. 27 is a cross-sectional view of the cap, according to the fourth embodiment.

FIG. 27 is a cross-sectional view of the cap.

Referring to FIG. 21, the cap 300 may be formed to have a cylindrical shape surrounding the first socket body 210 of the socket 200. At least one locking groove 301 may be formed at a predetermined interval on a portion of the outer circumferential surface of the cap 300. Specifically, the locking groove 301 may be formed to have a shape allowing the locking projection 214 formed on the outer circumferential surface of the first socket body 210 of the socket 200 to be inserted thereinto.

The hole 310 may be formed on one side of the cap 300. The hole 310 has a diameter less than the inner diameter of the cap 300. The vibration isolation member 100 may be inserted into the hole 310. The cylindrical cap projection 311 which projects toward the inside of the cap 300 may be formed on the inner surface of the cap 300 in which the hole 310 is formed. Also, the cup inner surface 611 may be formed on the cap projection 311.

The cap inner groove 721 into which the second damper rib 720 is inserted may be formed between the cap projection 311 and the inner surface of the cap 300. The cap inner groove 721 may be disposed along a circular periphery in such a manner as to correspond to the position of the second damper rib 720. The cap inner groove 721 may have a size to include a void in a state where the second damper rib 720 has been inserted into the cap inner groove 721.

Figure 28:
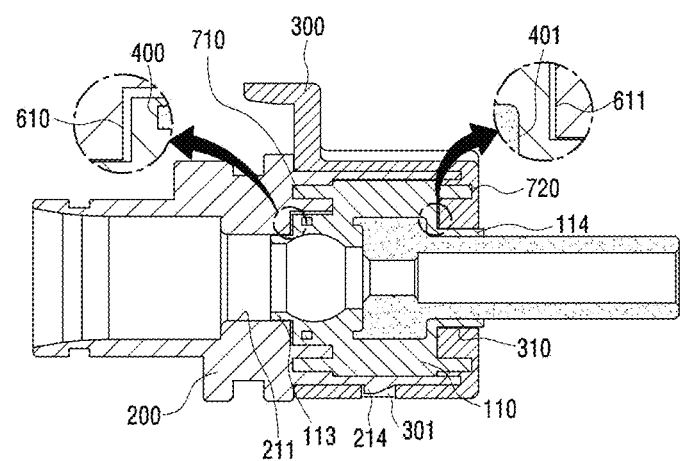
FIG. 28 is a cross-sectional view of the vibration isolation member, the socket, and the cap coupled to each other, according to the fourth embodiment.

FIG. 28 is a cross-sectional view showing a state where the vibration isolation member, socket, and cap have been coupled to each other.

Referring to FIG. 28, the socket inner groove 711 formed in the first socket body 210 of the socket 200 is placed at the same position in the longitudinal direction of the first damper rib 710 formed on the front of the second damper body 112 of the damper 110.

When the first damper rib 710 is inserted into the socket inner groove 711 and the first damper neck 113 of the damper 110 is inserted into the socket through-hole 211 of the socket 200, the vibration isolation member 100 is fully inserted into the socket 200.

In a state where the vibration isolation member 100 is inserted into the socket 200, the cap inner groove 721 formed in the cap 300 is placed at the same position in the longitudinal direction of the second damper rib 720 formed in the front of the second damper body 112 of the damper 110

When the second damper rib 720 is inserted into the cap inner groove 721 and the second damper neck 114 of the damper 110 is inserted into the hole 310 of the cap 300, the vibration isolation member 100 is fully inserted into the cap 300. Here, the locking projection 214 formed on the outer circumferential surface of the first socket body 210 of the socket 200 may be locked to the locking groove 301 of the cap 300.

Here, when an external force is applied to the front of the vibration isolation member 100, an excessive force which is transferred to the damper 110 can be blocked because the front support surface 400 of the first cup body 121 is very close to and faces the socket inner surface 610 of the first socket body 210. Therefore, the forward movement of the damper 110 can be reduced, and thus, the shape of the damper 110 can be prevented from being transformed. Likewise, when an external force is applied to the rear of the vibration isolation member 100, an excessive force which is transferred to the damper 110 can be blocked because the rear support surface 401 of the first cup body 121 is very close to and faces the cup inner surface 611 of the cap 300. Therefore, the backward movement of the damper 110 can be reduced, and thus, the shape of the damper 110 can be prevented from being transformed.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although preferred embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A cable anchoring device comprising:
   a vibration isolation member comprising a damper;
   a socket; and
   a cap,
   wherein the damper has one or more damper holes formed in the damper to pass through the damper from a front to a rear in a longitudinal direction of the damper,
   wherein the socket includes one or more ribs formed to protrude in a longitudinal direction of the socket to be inserted into the one or more damper holes,
   wherein the vibration isolation member is inserted into a hole formed in the cap,
   wherein the socket is coupled to the cap,
   wherein each of the damper holes has a size determined to form a void surrounding the rib in a state where the rib of the socket has been inserted into the damper hole.

2. The cable anchoring device of claim 1, wherein the damper comprises a first damper body and a second damper body, wherein the first damper body comprises a first damper projection, and wherein the damper hole is formed at a position corresponding to the position of the first damper projection.

3. The cable anchoring device of claim 2, wherein the damper hole is formed in the second damper body in a longitudinal direction of the second damper body.

4. The cable anchoring device of claim 2, wherein a second damper projection and a second damper groove are formed along an outer circumferential surface of the second damper body.

5. The cable anchoring device of claim 1, wherein the vibration isolation member further comprises a cup, wherein the cup comprises a first cup body and a second cup body, and wherein the damper and the first cup body are coupled to each other by an insert molding method.

6. The cable anchoring device of claim 5, wherein a cup hole is formed in the first cup body.

7. The cable anchoring device of claim 5, wherein the socket comprises a socket inner surface, and wherein the first cup body comprises a front support surface which faces the socket inner surface.

8. The cable anchoring device of claim 5, wherein the cap comprises a cup inner surface, and wherein the first cup body comprises a rear support surface which faces the cup inner surface.

9. The cable anchoring device of claim 5,
wherein the socket comprises a socket inner surface,
wherein the cap comprises a cup inner surface,
wherein the first cup body comprises a front support surface which faces the socket inner surface and a rear support surface which faces the cup inner surface,
wherein the first cup body and the second cup body have a cylindrical shape, and
wherein a diameter of the first cup body is larger than a diameter of the second cup body.

10. The cable anchoring device of claim 9, wherein the rib comprises a rib inner surface, wherein the first cup body comprises an outer circumferential support surface which faces the rib inner surface, and wherein the outer circumferential support surface is formed between the front support surface and the rear support surface.

11. The cable anchoring device of claim 1, wherein the one or more damper holes are arranged at uniform intervals along a circumferential surface of the damper.

12. The cable anchoring device of claim 1, wherein a number of the one or more ribs is identical to a number of the one or more damper holes.

* * * * *